United States Patent
Sawant et al.

(10) Patent No.: US 9,684,885 B2
(45) Date of Patent: Jun. 20, 2017

(54) METHOD AND SYSTEM FOR CONVERTING UBL PROCESS DIAGRAMS TO OWL

(75) Inventors: Kiran Prakash Sawant, Mumbai (IN); Suman Roy, Bangalore (IN)

(73) Assignee: Infosys Technologies, Ltd., Bangalore (IN)

(*) Notice: Subject to any disclaimer, the term of this patent is extended or adjusted under 35 U.S.C. 154(b) by 0 days.

(21) Appl. No.: 13/325,317

(22) Filed: Dec. 14, 2011

(65) Prior Publication Data

US 2012/0185517 A1    Jul. 19, 2012

(30) Foreign Application Priority Data

Jan. 17, 2011 (IN) .............................. 144/CHE/2011

(51) Int. Cl.
  *G06F 17/30* (2006.01)
  *G06Q 10/10* (2012.01)
(52) U.S. Cl.
  CPC .................................. *G06Q 10/10* (2013.01)
(58) Field of Classification Search
  CPC ................................. G06F 17/00; G06F 17/30
  See application file for complete search history.

(56) References Cited

U.S. PATENT DOCUMENTS

| | | | |
|---|---|---|---|
| 7,516,229 B2* | 4/2009 | Trastour et al. | 709/230 |
| 7,558,791 B2* | 7/2009 | Wahl | |
| 7,805,451 B2* | 9/2010 | Hosokawa | 707/755 |
| 7,860,815 B1* | 12/2010 | Tangirala | G06N 5/02 706/45 |
| 7,865,519 B2* | 1/2011 | Stuhec | G06Q 30/08 707/771 |
| 7,912,826 B2* | 3/2011 | Hosokawa | 707/705 |
| 7,921,065 B2* | 4/2011 | Kim et al. | 706/12 |
| 7,933,764 B2* | 4/2011 | Kang et al. | 704/8 |
| 8,041,746 B2* | 10/2011 | Stuhec | G06F 17/2247 707/802 |
| 8,060,519 B2* | 11/2011 | Hosokawa | 707/755 |
| 8,065,655 B1* | 11/2011 | Deo et al. | 717/106 |

(Continued)

OTHER PUBLICATIONS

Brockmans, Sara; Volz, Raphael; Eberhart, Andreas; and Loffler, Peter, "Visual Modeling of OWL DL Ontologies Using UML," 2004, Springer-Verlag Berlin, ISWC 2004, pp. 198-213.*

(Continued)

*Primary Examiner* — Farhan Syed
(74) *Attorney, Agent, or Firm* — LeClairRyan, a Professional Corporation (57) ABSTRACT

The present invention includes a method and a system for creating Web Ontology Language (OWL) ontology from a Universal Business Language (UBL) process diagram. The UBL process diagram includes one or more processes, one or more partitions, one or more activities, one or more objects, an initial node, and a final node. At least one of the processes, the partitions, the activities, and the objects are extracted from the UBL process diagram. A first OWL class, a second OWL class, and a third OWL class are created corresponding to the processes, partitions, and objects, respectively. Thereafter, an object property is created corresponding to each of the activities, the initial node, and the final node. Finally, the first OWL class, the second OWL class, the third OWL class, and each of the created object property are added to obtain the OWL ontology.

21 Claims, 6 Drawing Sheets

(56) References Cited

U.S. PATENT DOCUMENTS

| | | | |
|---|---|---|---|
| 8,214,401 B2* | 7/2012 | Rao | G06F 17/30734 707/794 |
| 8,244,769 B2* | 8/2012 | Hosomi et al. | 707/794 |
| 8,745,097 B2* | 6/2014 | Sawant | G06F 17/3092 707/811 |
| 2004/0139095 A1* | 7/2004 | Trastour et al. | 707/100 |
| 2005/0091174 A1* | 4/2005 | Akkiraju et al. | 705/75 |
| 2007/0226262 A1* | 9/2007 | Akkiraju et al. | 707/104.1 |
| 2008/0071521 A1* | 3/2008 | Larvet | 704/9 |
| 2008/0208774 A1* | 8/2008 | Kim et al. | 706/12 |
| 2010/0121885 A1* | 5/2010 | Hosomi et al. | 707/794 |
| 2010/0175054 A1* | 7/2010 | Matusikova et al. | 717/136 |
| 2010/0228782 A1* | 9/2010 | Rao | G06F 17/30734 707/794 |
| 2011/0022560 A1* | 1/2011 | Breiter et al. | 706/47 |
| 2011/0107302 A1* | 5/2011 | Du et al. | 717/121 |
| 2012/0005655 A1* | 1/2012 | Roy et al. | 717/123 |
| 2012/0159437 A1* | 6/2012 | Du et al. | 717/120 |
| 2012/0185517 A1* | 7/2012 | Sawant et al. | 707/803 |
| 2013/0204910 A1* | 8/2013 | Sawant | G06F 17/3092 707/811 |

OTHER PUBLICATIONS

Roy, Suman, et al., "Ontology Modeling of UBL Process Diagrams using OWL," Oct. 8-10, 2010, International Conference on Computer Information Systems and Industrial Management Applications (CISIM), IEEE, pp. 535-540.*

Zou, Youyong, et al., "F-OWL: An Inference Engine for the Semantic Web," 2005, Springer-Verlag, pp. 238-248.*

Kalyanpur, Aditya, et al., "Debugging unsatisfiable classes in OWL ontologies," 2005, Journal of Web Semantics, Science Direct, pp. 268-293.*

Rahmanzadeh, B., et al., "Towards an Ontology for Automating Collaborative Business Processes," 2010, IEEE, 2010 14th IEEE International Enterprise Distributed Object Computing Conference Workshops, pp. 311-319.*

Horrocks, et al., "SWRL: A Semantic Rule Language Combining OWL and RuleML," W3C Member Submission May 21, 2004, pp. 1-31.*

Gannod, et al., "Facilitating the Specification of Semantic Web Services Using Model-Driven Development," International Journal of Web Services, 3(3), Jul.-Sep. 2006, pp. 61-81.*

Bohring, Hammes, et al., "Mapping XML to OWL Ontologies," In Leipziger Informatik-Tage, LNI, vol. 72, 2005, pp. 147-156.*

Lacoste, Damien, Kiran Prakash Sawant, and Suman Roy. "An efficient XML to OWL converter." In Proceedings of the 4th India software engineering conference, pp. 145-154. ACM, 2011.*

Martin, David, Mark Burstein, Jerry Hobbs, Ora Lassila, Drew McDermott, Sheila McIlraith, Srini Narayanan et al. "OWL-S: Semantic markup for web services." W3C member submission 22 (2004): Apr. 2007.*

Timm, John TE, and Gerald C. Gannod. "Specifying semantic web service compositions using UML and OCL." In Web Services, 2007. ICWS 2007. IEEE International Conference on, pp. 521-528. IEEE, 2007.*

* cited by examiner

FIG. 4B ies. Finally, the first OWL class, the second OWL class, the
METHOD AND SYSTEM FOR CONVERTING UBL PROCESS DIAGRAMS TO OWL This application claims the benefit of Indian Patent Application Filing No. 144/CHE/2011, filed Jan. 17, 2011, which is hereby incorporated by reference in its entirety.

FIELD OF THE INVENTION

The present invention relates, in general, to creating a knowledge-based representation from a Universal Business Language (UBL) process diagram. More specifically, the invention relates to a method and system for creating Web Ontology Language (OWL) ontology from the UBL process diagram.

BACKGROUND

Universal business language (ubl) is developed by the organization for the advancement of structured information standards (oasis) for building up common extensible markup language (xml) business document schema. The common xml business document schema conforms to the widely accepted industry criteria. Different participants agree on a common vocabulary, as a result of which the schema provides inter-operability in the electronic business domain.

A typical ubl process diagram offers a library of reusable components and a set of electronic xml business documents schema. Examples of the reusable components include address, price, item, and the like, while the electronic xml business documents schema include order, order cancelation, dispatch advice, remittance advice, invoice, and the like. The xml business documents schema together with process descriptions support the typical business processes for covering a supply chain from sourcing to payment. Further, unified modeling language (uml) is employed for creating visual models of the ubl process diagram. Various examples of the uml diagrams include class diagrams, sequence diagrams, and activity diagrams.

Since the UBL process diagram (represented using a UML diagram, such as a UML class diagram) is a visual model, it becomes difficult to extract meaningful information from it. To overcome this limitation, some existing technologies have added a knowledge dimension to UML class diagrams by converting them into Web Ontology Language (OWL) using a Model Driven Development-based approach. OWL is primarily a knowledge-based representation of entities. It describes the problem domain and semantic relations of entities.

For converting a UML class diagram to OWL, the technologies follow a two-step generic technique. In the first step, the ontology is manually extracted from the UML class diagram. This ontology is hand-coded and is, therefore, subject to a knowledge designer's perception of the UML class diagram. In the second step, instance modeling is performed where each process of the UML class diagram is converted to ontology instances.

A major limitation of the steps described above is that the manual extraction of the ontology becomes a tedious task for large UBL process diagrams (or UML class diagrams), such as Create Catalogue process and Update Catalogue pricing process. Further, the manual extraction faces problems, owing to the subjectivity involved.

In light of the above mentioned limitations, some current technologies have automated the step of extracting the ontology from a uml class diagram by utilizing owl for service (owl-s). In such a scenario, first a uml profile is created for the uml class diagram. Thereafter, the uml profile is converted to owl-s. An example of such a technique is described in "ontology modeling and mda" authored by dragan djurić, dragan gašević, vladan devedžić, and is published by eth zurich. The authors propose a technique of automatically generating owl from a uml model by utilizing ontology uml profile (oup) definition.

However, in such techniques, an intermediary conversion to uml profiles is involved before the uml class diagram is completely converted into owl. This requires additional processing, and thus adds to the computational load. Further, the service model offered by owl-s is inherently complex.

Another limitation is that the current technologies only utilize the uml class diagram model for conversion to owl. For instance, a work has been described in "visual modeling of owl dl ontologies using uml" authored by sara brockmans, raphael volz, andreas eberhart, and peter loffler, and has been published in iswc, lncs, 2004. The authors propose a meta object facility (mof) compliant metamodel for creating owl ontology from a uml class diagram. However, there is no mechanism provided by these technologies for creating owl ontology from a uml activity diagram.

In light of the above discussion, there is a need for directly converting ubl process diagrams into owl, without creating uml profiles. Further, there is also a need for utilizing a uml activity diagram representation of ubl for conversion to owl.

SUMMARY

The present invention includes a method for creating Web Ontology Language (OWL) ontology from a Universal Business Language (UBL) process diagram. The UBL process diagram includes one or more processes, one or more partitions, one or more activities, one or more objects, an initial node, and a final node. At least one of the processes, the partitions, the activities, and the objects are extracted from the UBL process diagram. A first OWL class is created corresponding to the processes, such that the processes are assigned as instances to the first OWL class. Further, a second OWL class is created corresponding to the partitions, such that the partitions are assigned as instances to the second OWL class. Furthermore, a third OWL class is created corresponding to the objects, such that the objects are assigned as instances to the third OWL class. An object property is then created corresponding to each of the activities. Finally, the first OWL class, the second OWL class, the third OWL class, and the each of the created object property are added, thereby facilitating the creation of the OWL ontology.

The present invention further describes a system for creating Web Ontology Language (OWL) ontology from a Universal Business Language (UBL) process diagram. The UBL process diagram includes one or more processes, one or more partitions, one or more activities, one or more objects, an initial node, and a final node. The system includes an extraction module, a creation module, and an accumulation module. The extraction module extracts at least one of the processes, the partitions, the activities, and the objects from the UBL process diagram. Thereafter, the creation module creates a first OWL class, a second OWL class, a third OWL class, and one or more object properties. The first OWL class is created corresponding to the processes, such that the processes are assigned as instances to the first OWL class. Further, the second OWL class is created corresponding to the partitions, such that the partitions are assigned as instances to the second OWL class. Furthermore, the third OWL class is created corresponding to the objects, such that the objects are assigned as instances to the third OWL class. The one or more object properties are then created corresponding to each of the activities. Finally, the accumulation module adds the first OWL class, the second OWL class, the third OWL class, and each of the created object property, thereby facilitating the creation of the OWL ontology.

The method and the system described above have numerous advantages. The present invention facilitates creating OWL ontology from a UBL process diagram, without creating an intermediary UML profile. Further, the present invention allows the use of an UML activity diagram for conversion to OWL. The present invention also facilitates performing reasoning on the OWL ontology and allows editing and modification using description logic reasoners. In addition, the present invention allows querying of the OWL ontology for extracting useful information.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which:

FIG. 1 illustrates an exemplary Universal Business Language (UBL) process diagram, in accordance with an embodiment of the invention;

FIGS. 2A and 2B illustrate a flowchart of a method for creating Web Ontology Language (OWL) ontology from a UBL process diagram, in accordance with an embodiment of the invention;

FIG. 3 is a block diagram of a system for creating OWL ontology from a UBL process diagram, in accordance with an embodiment of the invention; and FIGS. 4A and 4B illustrate a block diagram of a system for viewing and querying the OWL ontology created from the UBL process diagram, in accordance with an embodiment of the invention.

DETAILED DESCRIPTION OF THE DRAWINGS

The present invention provides a method, a system, and a computer program product for creating Web Ontology Language (OWL) ontology from a Universal Business Language (UBL) process diagram. Further, a Unified Modeling Language (UML) activity diagram representation of the UBL process diagram is utilized for performing the conversion. In addition, the created OWL ontology conforms to OWL Description Logic (OWL-DL).

To facilitate a full and clear understanding of the present invention, a brief description of the UBL process diagram is provided.

UBL Process Diagram

The UBL process diagram is visually represented using an UML activity diagram. Further, it may be apparent to a person skilled in the art that the UML activity diagrams are coded using XML Metadata Interchange (XMI).

The UML activity diagram models the procedural flow of actions or activities that are subsumed by a larger activity. The UML activity diagram includes a plurality of elements representing one or more processes, one or more partitions, one or more activities, and one or more objects. The UML activity diagram also includes an initial node and one or more final nodes. Further, the elements are connected via a plurality of edges. The description of the elements will now be described in brief.

The initial node is the starting point of the UML activity diagram. Further, the element which is used to represent the initial node is a filled circle.

The final node is the terminating point of the UML activity diagram and is represented by a circle surrounding a smaller solid circle. The initial node and the one or more final nodes connect a current process with other processes of the UML activity diagram.

The activity is a task to be performed within a process and is represented by a rounded rectangle. Further, the activity may also be a flow of other activities, i.e., a sub process. In such a scenario, a plus sign is added to the bottom center of the rounded rectangle.

The object is an output of an activity and is an input to another activity. Further, the object is represented as a rectangle.

The partition is used to represent entities that execute the activities. The partitions are represented by adding vertical columns to the UML activity diagram. It may be apparent to a person skilled in the art that partitions may also be referred to as swimlanes.

In addition to the above described elements, the UML activity diagram may include one or more gateways. The gateways are utilized for forking a sequence of activities into two or more different sequence of activities. Similarly, the gateways also control merging/joining of the two or more different sequences of activities into a single sequence of activity. Further, the element which is used to represent the gateway is a diamond-shape box.

Figure 1:
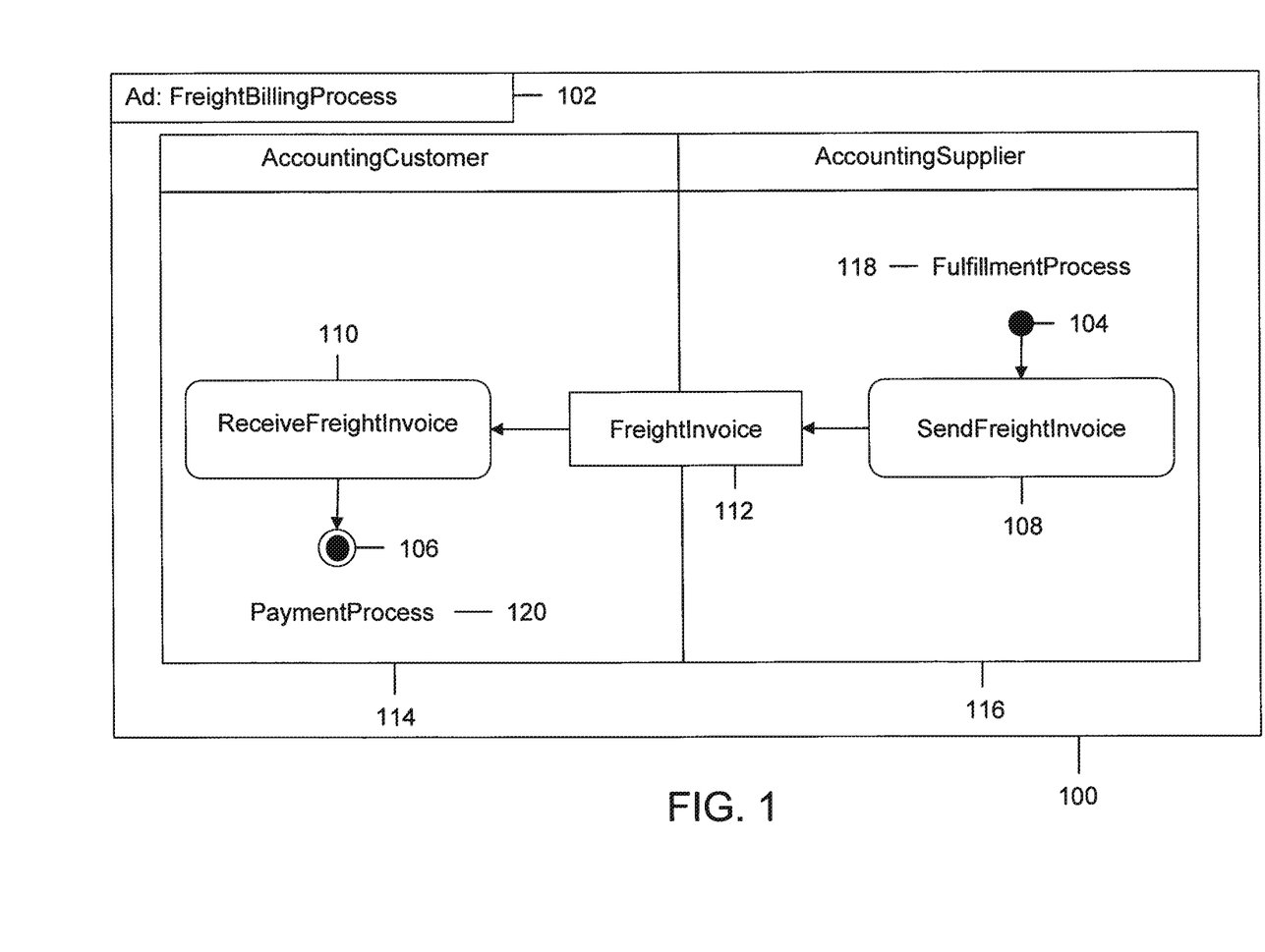

FIG. 1 illustrates an exemplary UBL process diagram 100, in accordance with an embodiment of the invention. UBL process diagram 100 is modeled around activities and is represented using an UML activity diagram. Further, a plurality of elements included in UBL process diagram 100 will now be discussed.

UBL process diagram 100 describes the activities for a process FreightBillingProcess 102. An initial node 104 and a final node 106 connect FreightBillingProcess 102 with other processes, i.e., a process FulfillmentProcess 118 and a process PaymentProcess 120, respectively.

FreightBillingProcess 102 includes one or more activities. The activities correspond to an activity SendFreightInvoice 108 and an activity ReceiveFreightInvoice 110. An object FreightInvoice 112 is connected to the output of SendFreightInvoice 108 and to an input of ReceiveFreightInvoice 110. Further, initial node 104, final node 106, SendFreightInvoice 108, ReceiveFreightInvoice 110, and FreightInvoice 112 are connected via a plurality of edges.

In addition, FreightBillingProcess 102 includes one or more partitions. The partitions correspond to a partition AccountingCustomer 114 and a partition AccountingSupplier 116. Further, AccountingCustomer 114 encapsulates ReceiveFreightInvoice 110, while AccountingSupplier 116 encapsulates SendFreightInvoice 108.

Figure 2A:
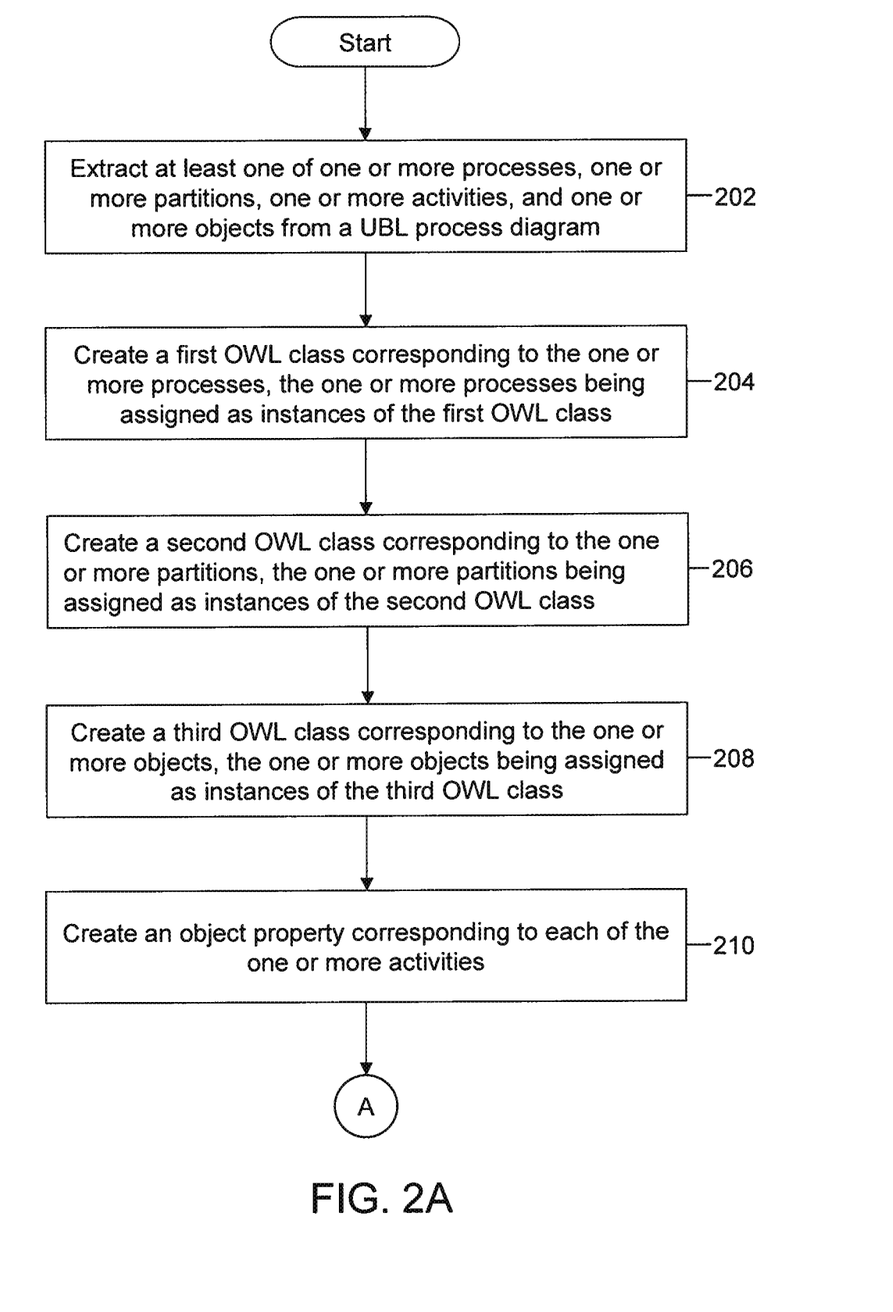
Figure 2B:
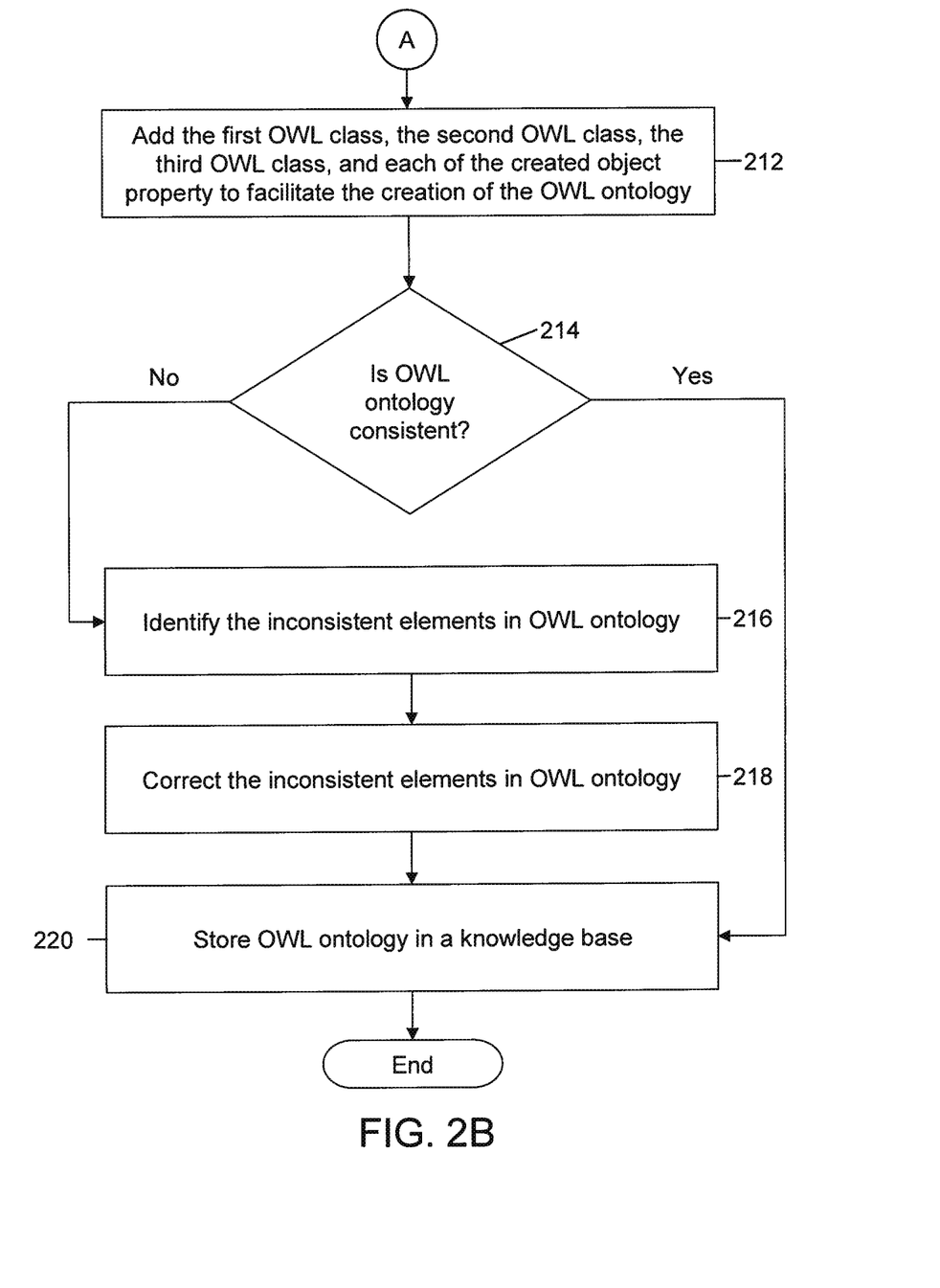

FIGS. 2A and 2B illustrate a flowchart of a method for creating OWL ontology from a UBL process diagram, in accordance with an embodiment of the invention. The UBL process diagram typically includes one or more processes, one or more partitions, one or more activities, one or more objects, an initial node, and a final node. For the sake of clarity of the present invention, the OWL ontology will be created from UBL process diagram 100 described in FIG. 1.

At 202, at least one of the processes, the partitions, the activities, and the objects are extracted from UBL process diagram 100.

To perform the extraction, a parsing algorithm is employed to execute on the XMI representation of UBL process diagram 100. One or more XMI elements that correspond to the processes, the partitions, the activities, and the objects are then extracted from UBL process diagram 100. As discussed above in FIG. 1, the processes are FreightBillingProcess 102, FulfillmentProcess 118, and PaymentProcess 120, while the partitions are AccountingCustomer 114 and AccountingSupplier 116. Further, the activities are SendFreightInvoice 108 and ReceiveFreightInvoice 110, and the object is FreightInvoice 112. In addition, initial node 104 and final node 106 are extracted from UBL process diagram 100.

The XMI elements representing UBL process diagram 100 will now be discussed in detail.

UML2: ActivityPartition

The XMI element UML2: ActivityPartition corresponds to the partitions in UBL process diagram 100. The following is an exemplary XMI code snippet illustrating the partitions:

```
<UML2: ActivityPartition xmi id: "XXX" name = "AccountingSupplier"
visibility = "public" isSpecification="false">
<UML2: ActivityPartition xmi id: "XXX" name = "AccountingCustomer"
visibility = "public" isSpecification="false">
```

UML2: Pin

The XMI element UML2: Pin corresponds to the object in UBL process diagram 100. The following is an exemplary XMI code snippet illustrating the objects:

```
<UML2: Pin xmi id: "XXX" name = "FreightInvoice" visibility =
"public" isSpecification="false">
```

UML2: CallAction

The XMI element UML2: CallAction corresponds to the activities in UBL process diagram 100. The following is an exemplary XMI code snippet illustrating the activities:

```
<UML2: CallAction xmi id: "XXX" name = "SendFreightInvoice"
visibility = "public" isSpecification="false">
<UML2: CallAction xmi id: "XXX" name = "ReceiveFreightInvoice"
visibility = "public" isSpecification="false">
```

UML2: InitialNode

The XMI element UML2: InitialNode corresponds to initial node 104 in UBL process diagram 100. The following is an exemplary XMI code snippet illustrating initial node 104:

```
<UML2:InitialNode xmi.id="XXX" name="FulfillmentProcess"
visibility="public" isSpecification="true">
```

UML2: ActivityFinalNode

The XMI element UML2: ActivityFinalNode corresponds to final node 106 in UBL process diagram 100. The following is an exemplary XMI code snippet illustrating final node 106:

```
<UML2: ActivityFinalNode xmi.id="XXX" name="PaymentProcess"
visibility="public" isSpecification="true">
```

UML: Model

In addition to the above discussed XMI elements, the name of UBL process diagram 100 is extracted from the XMI element UML: Model. The following is an exemplary XMI code snippet illustrating UML: Model:

```
<UML: Model xmi:id "XXX" name: "FreightBillingProcess">
```

Further, the procedural flow between initial node 104, the activities, the object, and final node 106 can be extracted using the following XMI elements: UML2: ActivityNode.incomingEdge, and UML2: ActivityNode.outgoingEdge.

At 204, a first OWL class is created corresponding to the processes, such that the processes are assigned as instances to the first OWL class. With reference to UBL process diagram 100, the first OWL class corresponds to an OWL class Processes.

In a preferred embodiment of the present invention, the processes are determined from the XMI elements UML: Model, UML2: InitialNode, and UML2: ActivityFinalNode. Therefore, FreightBillingProcess 102, FulfillmentProcess 118, and PaymentProcess 120 are assigned as instances to the OWL class Processes.

The following is a corresponding OWL code snippet illustrating the instances of the OWL class Processes:

```
<owl:Class xmlns:owl="http://www.w3.org/2002/07/owl#"
    xmlns:rdf="http://www.w3.org/1999/02/22-rdf-syntax-ns#"
    rdf:ID="Processes"/>
<owl:Class xmlns:owl="http://www.w3.org/2002/07/owl#"
    xmlns:rdf="http://www.w3.org/1999/02/22-rdf-syntax-ns#"
    rdf:ID="FreightBillingProcess">
    <rdfs:subClassOf xmlns:rdfs="http://www.w3.org/2000/01/rdf-
    schema#" rdf:resource="#Processes"/>
</owl:Class>
<owl:Class xmlns:owl="http://www.w3.org/2002/07/owl#"
    xmlns:rdf="http://www.w3.org/1999/02/22-rdf-syntax-ns#"
    rdf:ID="FulfillmentProcess">
    <rdfs:subClassOf xmlns:rdfs="http://www.w3.org/2000/01/rdf-
    schema#" rdf:resource="#Processes"/>
</owl:Class>
<owl:Class xmlns:owl="http://www.w3.org/2002/07/owl#"
    xmlns:rdf="http://www.w3.org/1999/02/22-rdf-syntax-ns#"
    rdf:ID="PaymentProcess">
    <rdfs:subClassOf xmlns:rdfs="http://www.w3.org/2000/01/rdf-
    schema#" rdf:resource="#Processes"/>
```

At 206, a second OWL class is created corresponding to the partitions, such that the partitions are assigned as instances to the second OWL class.

With reference to UBL process diagram 100, the second OWL class corresponds to an OWL class Actors. Therefore, AccountingCustomer 114 and AccountingSupplier 116 are assigned as instances to the OWL class Actors.

The following is a corresponding OWL code snippet illustrating the instances of the OWL class Actors:

```
<owl:Class xmlns:owl="http://www.w3.org/2002/07/owl#"
    xmlns:rdf="http://www.w3.org/1999/02/22-rdf-syntax-ns#"
    rdf:ID="Actors"/>
<owl:Class xmlns:owl="http://www.w3.org/2002/07/owl#"
    xmlns:rdf="http://www.w3.org/1999/02/22-rdf-syntax-ns#"
    rdf:ID="AccountingCustomer">
    <rdfs:subClassOf xmlns:rdfs="http://www.w3.org/2000/01/rdf-
    schema#" rdf:resource="#Actors"/>
</owl:Class>
<owl:Class xmlns:owl="http://www.w3.org/2002/07/owl#"
    xmlns:rdf="http://www.w3.org/1999/02/22-rdf-syntax-ns#"
    rdf:ID="AccountingSupplier">
    <rdfs:subClassOf xmlns:rdfs="http://wvvw.w3.org/2000/01/rdf-
    schema#" rdf:resource="#Actors"/>
</owl:Class>
```

At 208, a third OWL class is created corresponding to the objects, such that the objects are assigned as instances to the third OWL class.

With reference to UBL process diagram 100, the third OWL class corresponds to an OWL class UBLDocuments. Therefore, FreightInvoice 112 is assigned as an instance to the OWL class UBLDocuments.

The following is an exemplary OWL code snippet illustrating the instance of the OWL class UBLDocuments:

```
<owl:Class xmlns:owl="http://www.w3.org/2002/07/owl#"
    xmlns:rdf="http://www.w3.org/1999/02/22-rdf-syntax-ns#"
    rdf:ID="UBLDocuments"/>
<owl:Class xmlns:owl="http://www.w3.org/2002/07/owl#"
    xmlns:rdf="http://www.w3.org/1999/02/22-rdf-syntax-ns#"
    rdf:ID="FreightInvoice">
    <rdfs:subClassOf xmlns:rdfs="http://www.w3.org/2000/01/rdf-
        schema#" rdf:resource="#UBLDocuments"/>
</owl:Class>
```

At 210, an object property is created corresponding to each of the activities. With reference to UBL process diagram 100, SendFreightInvoice 108 and ReceiveFreightInvoice 110 are made as the object properties. Further, a domain and a range are assigned to each of the created object property. The assignment of the domain and the range to each of the created object property will be described in detail.

The partition associated with an object property is assigned as the domain of the object property. Further, the object which is linked with the object property is assigned as the range of the object property.

As an example, consider the activity SendFreightInvoice 108. SendFreightInvoice 108 belongs to the partition AccountingSupplier 116, and thus AccountingSupplier 116 becomes the domain for SendFreightInvoice 108. Also, FreightInvoice 112 is the object which is linked to SendFreightInvoice 108. Thus, FreightInvoice 112 becomes the range for SendFreightInvoice 108.

Similarly, consider the activity ReceiveFreightInvoice 110. ReceiveFreightInvoice 110 belongs to the partition AccountingCustomer 114, and thus AccountingCustomer 114 becomes the domain for ReceiveFreightInvoice 110. Also, FreightInvoice 112 is the object which is linked to ReceiveFreightInvoice 110. Thus, FreightInvoice 112 becomes the range for ReceiveFreightInvoice 110.

The following is the OWL code snippet illustrating the created object properties with the corresponding domain and range:

```
<owl:ObjectProperty xmlns:owl="http://www.w3.org/2002/07/owl#"
    xmlns:rdf="http://www.w3.org/1999/02/22-rdf-syntax-ns#"
    rdf:ID="ReceiveFreightInvoice">
    <rdfs:domain xmlns:rdfs="http://www.w3.org/2000/01/rdf-schema#"
        rdf:resource="# AccountingCustomer "/>
    <rdfs:range xmlns:rdfs="http://www.w3.org/2000/01/rdf-schema#"
        rdf:resource="# FreightInvoice "/>
</owl:ObjectProperty>
<owl:ObjectProperty xmlns:owl="http://www.w3.org/2002/07/owl#"
    xmlns:rdf="http://www.w3.org/1999/02/22-rdf-syntax-ns#"
    rdf:ID="SendFreightInvoice">
    <rdfs:domain xmlns:rdfs="http://www.w3.org/2000/01/rdf-schema#"
        rdf:resource="#AccountingSupplier"/>
    <rdfs:range xmlns:rdfs="http://www.w3.org/2000/01/rdf-schema#"
        rdf:resource="#FreightInvoice"/>
</owl:ObjectProperty>
```

In a preferred embodiment of the present invention, an object property is also created corresponding to initial node 104 and final node 106. In addition, a domain and a range are assigned to each of the above created object property.

In accordance with the embodiment, the current process is assigned as a domain to both initial node 104 and final node 106. Therefore, FreightBillingProcess 102 is assigned as the domain to both initial node 104 and final node 106.

Further, the other processes with which initial node 104 and final node 106 are connected are assigned as the respective ranges. Therefore, FulfillmentProcess 118 is assigned as the range to initial node 104, while PaymentProcess 120 is assigned as the range for final node 106.

The following is the OWL code snippet illustrating the object properties for initial node 104 and final node 106 with the corresponding domain and range:

```
<owl:ObjectProperty xmlns:owl="http://www.w3.org/2002/07/owl#"
    xmlns:rdf="http://www.w3.org/1999/02/22-rdf-syntax-ns#"
    rdf:ID="Initial">
    <rdfs:domain xmlns:rdfs="http://www.w3.org/2000/01/rdf-schema#"
        rdf:resource="#FreightBillingProcess"/>
    <rdfs:range xmlns:rdfs="http://www.w3.org/2000/01/rdf-schema#"
        rdf:resource="#FulfillmentProcess"/>
</owl:ObjectProperty>
<owl:ObjectProperty xmlns:owl="http://www.w3.org/2002/07/owl#"
    xmlns:rdf="http://www.w3.org/1999/02/22-rdf-syntax-ns#"
    rdf:ID="Final">
    <rdfs:domain xmlns:rdfs="http://www.w3.org/2000/01/rdf-schema#"
        rdf:resource="#FreightBillingProcess"/>
    <rdfs:range xmlns:rdfs="http://www.w3.org/2000/01/rdf-schema#"
        rdf:resource="#PaymentProcess"/>
</owl:ObjectProperty>
```

At 212, the first OWL class, the second OWL class, the third OWL class, and each of the created object property are added to facilitate the creation of the OWL ontology. Therefore, with reference to UBL process diagram 100, the OWL class Processes, the OWL class Actors, the OWL class UBLDocuments, and the object properties corresponding to SendFreightInvoice 108, ReceiveFreightInvoice 110, initial node 104, and final node 106 are added to obtain the OWL ontology.

In a preferred embodiment of the present invention, one or more rules are associated with each of the created object property, such that the one or more rules capture the sequence of activities in UBL diagram 100. Further, the one or more rules are created in Semantic Web Rule Language (SWRL).

The following is an exemplary syntax for a SWRL rule: $q(x,y), r(z) \rightarrow p(x,y)$, where $q(x,y)$ and $p(x,y)$ are roles, and $r(z)$ is a concept description (instantiated class) in OWL.

In the present scenario, a subset of these rules is employed which can be represented as the following:

Source (sD, sR)→Target (tD, tR)

In the above syntax, sD and sR indicate the domain and the range of a source object property. Similarly, tD and tR indicate the domain and the range of a target object property.

The above syntax will now be exemplified with reference to FIG. 1. Based on UBL process diagram 100, the object properties were created corresponding to initial node 104, final node 106, SendFreightInvoice 108, and ReceiveFreightInvoice 110.

For determining the sequence of activities between the above-mentioned object properties, the edges connecting the corresponding activities are ascertained. The edges can be determined by analyzing XMI elements UML2:ActivityNode.incomingEdge, and UML2:ActivityNode.outgoingEdge.

Thereafter, the following SWRL rules are assigned:

Initial (FreightBillingProcess, FulfillmentProcess) →SendFreightInvoice (AccountingSupplier, FreightInvoice)

SendFreightInvoice (AccountingSupplier, FreightInvoice)→ReceiveFreightInvoice (AccountingCustomer, FreightInvoice)

ReceiveFreightInvoice (AccountingCustomer, FreightInvoice)→Final (FreightBillingProcess, PaymentProcess)

At 214, the OWL ontology is checked for consistency. If an inconsistency, such as contradictory facts, is detected, 216 is performed where the inconsistent elements in the OWL ontology are identified. At 218, the inconsistent elements in the OWL ontology are corrected. Finally, at 220, the OWL ontology is stored in a knowledge base.

Figure 3:
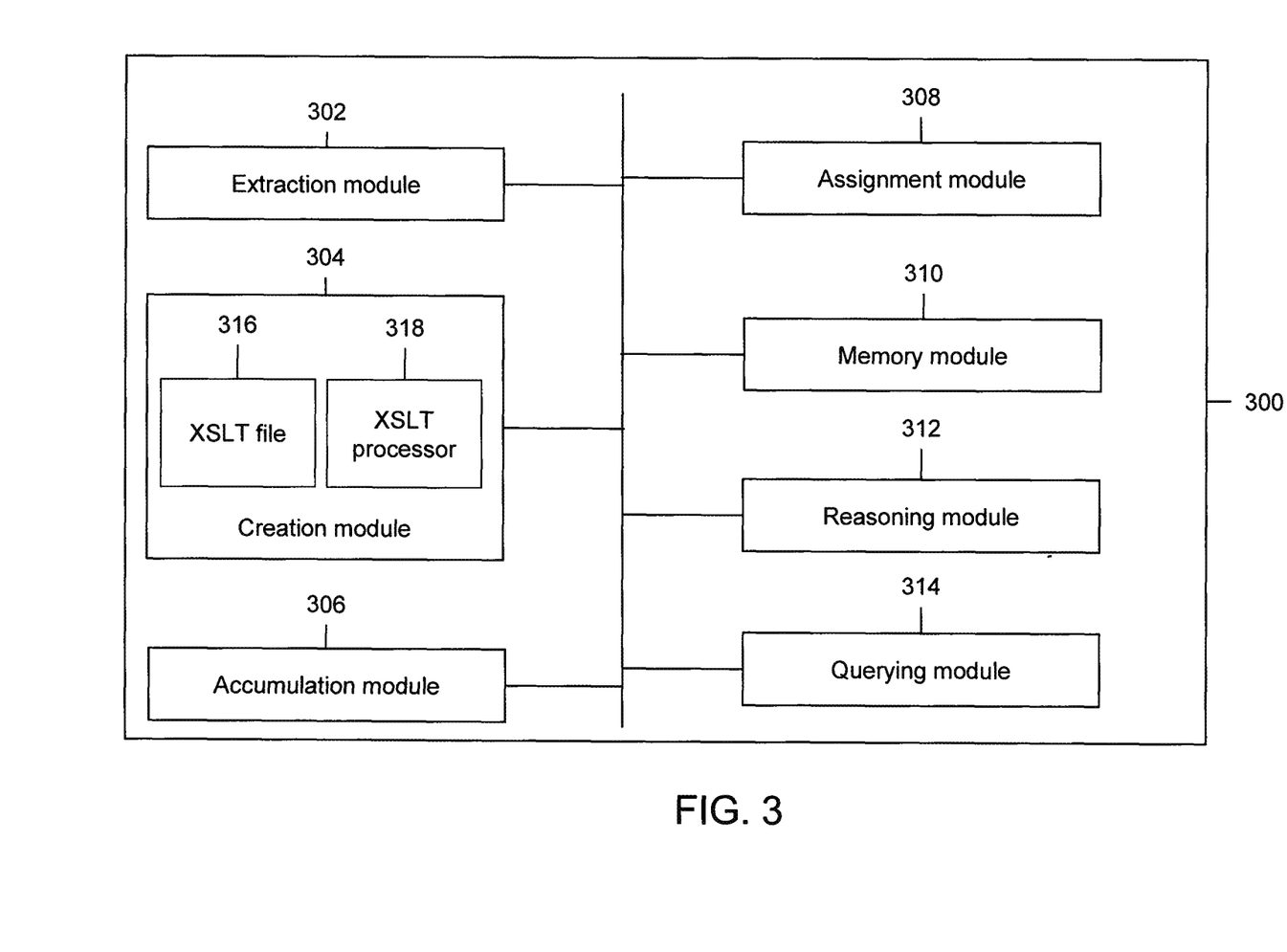

FIG. 3 is a block diagram of a system 300 for creating OWL ontology from a UBL process diagram, in accordance with an embodiment of the invention. The UBL process diagram includes one or more processes, one or more activities, one or more objects, one or more partitions, an initial node, and a final node.

System 300 includes an extraction module 302, a creation module 304, an accumulation module 306, an assignment module 308, a memory module 310, a reasoning module 312, and a querying module 314. Further, creation module 304 includes an Extensible Stylesheet Language Transformations (XSLT) file 316 and an XSLT processor 318.

Extraction module 302 extracts the processes, the partitions, the activities, and the objects from the UBL process diagram using a parsing algorithm. It may be apparent to a person skilled in the art that various techniques may be employed to execute the parsing algorithm. In a preferred embodiment of the present invention, extraction module 302 also extracts the initial node and the final node from the UBL process diagram. The details of extraction have already been described in the explanation of FIGS. 2A and 2B.

The functionality of creation module 304 will now be described. Xslt file 316 includes the mapping rules for transforming the xml-coded ubl process diagram to owl. The mapping rules have been summarized below:

| XMI element | Corresponding OWL element (s) |
|---|---|
| UML2: ActivityPartition | owl: class which is an instance of class Actors |
| UML2: Pin | owl: class which is an instance of class UBLDocuments |
| UML2: CallAction | owl: ObjectProperty |
| UML2: InitialNode | |
| UML2: ActivityFinalNode | |

For example, consider the XMI element UML2: ActivityPartition. The corresponding mapping rules in XSLT file 316 illustrates the following:

```
<xsl:for-each select =
"//UML2:Activity/UML2:Activity.partition/UML2:ActivityPartition/
UML2:ActivityGroup.subgroup/UML2:ActivityPartition">
    <xsl:element name="owl:Class">
        <xsl:attribute name="rdf:ID"><xsl:value-of
select="@name"/></xsl:attribute>
        <xsl:element name="rdfs:subClassOf">
            <xsl:attribute
name="rdf:resource">#Actors</xsl:attribute>
        </xsl:element>
    </xsl:element>
    <xsl:call-template name="putNewLine"/>
</xsl:for-each>
```

The above mapping rules describe that an OWL class Actors is created and for each UML2: ActivityPartition present in the UBL process diagram, an instance is assigned to the OWL class Actors. Similar mapping rules for creating other OWL classes, and OWL object properties from the UBL process diagram are specified in XSLT file 316.

Using the mapping rules, XSLT processor 318 creates a first OWL class, a second OWL class, and a third OWL class corresponding to the processes, the partitions, and the objects, respectively. As described in the explanation of FIGS. 2A and 2B, an OWL class Processes, an OWL class Actors, and an OWL class UBLDocuments correspond to the first OWL class, the second OWL class, and the third OWL class, respectively. Further, XSLT processor 318 creates an object property corresponding to each of the activities, the initial node, and the final node. The details of creating the first OWL class, the second OWL class, the third OWL class, and the object properties have already been discussed in the explanation of FIGS. 2A and 2B. Further, it may be apparent to person skilled in the art that any XSLT processor may be employed with the present invention.

In a preferred embodiment of the present invention, assignment module 308 assigns a domain and a range to each of the object properties, i.e., the object properties created corresponding to the activities, the initial node, and the final node. Further, assignment module 308 associates one or more rules with each of the object properties, such that the rules capture the sequence of activities. The details of assigning the domain and the range to each of the object properties and associating the rules with each of the object properties have already been discussed in the explanation of FIGS. 2A and 2B.

Accumulation module 306 adds the first OWL class, the second OWL class, the third OWL class, and the object properties to obtain the OWL ontology.

Reasoning module 312 checks the consistency of the OWL ontology. If an inconsistency is detected, reasoning module 312 identifies and corrects the inconsistent elements in the OWL ontology. Further, in another embodiment of the present invention, reasoning module 312 also allows a user to edit or modify the OWL ontology. It may be apparent to a person skilled in the art that the user may be either a knowledge designer or an ontology developer.

After the consistency of the OWL ontology is checked, memory module 310 stores the OWL ontology in a knowledge base. In an embodiment of the present invention, the knowledge base may reside on system 300. In another embodiment of the present invention, the knowledge base may reside on a remote system connected to system 300.

Querying module 314 facilitates the user to query the OWL ontology stored in the knowledge base to extract useful information. In a preferred embodiment of the present invention, reasoning module 312, and querying module 314 are third-party vendor software.

Figure 4A:
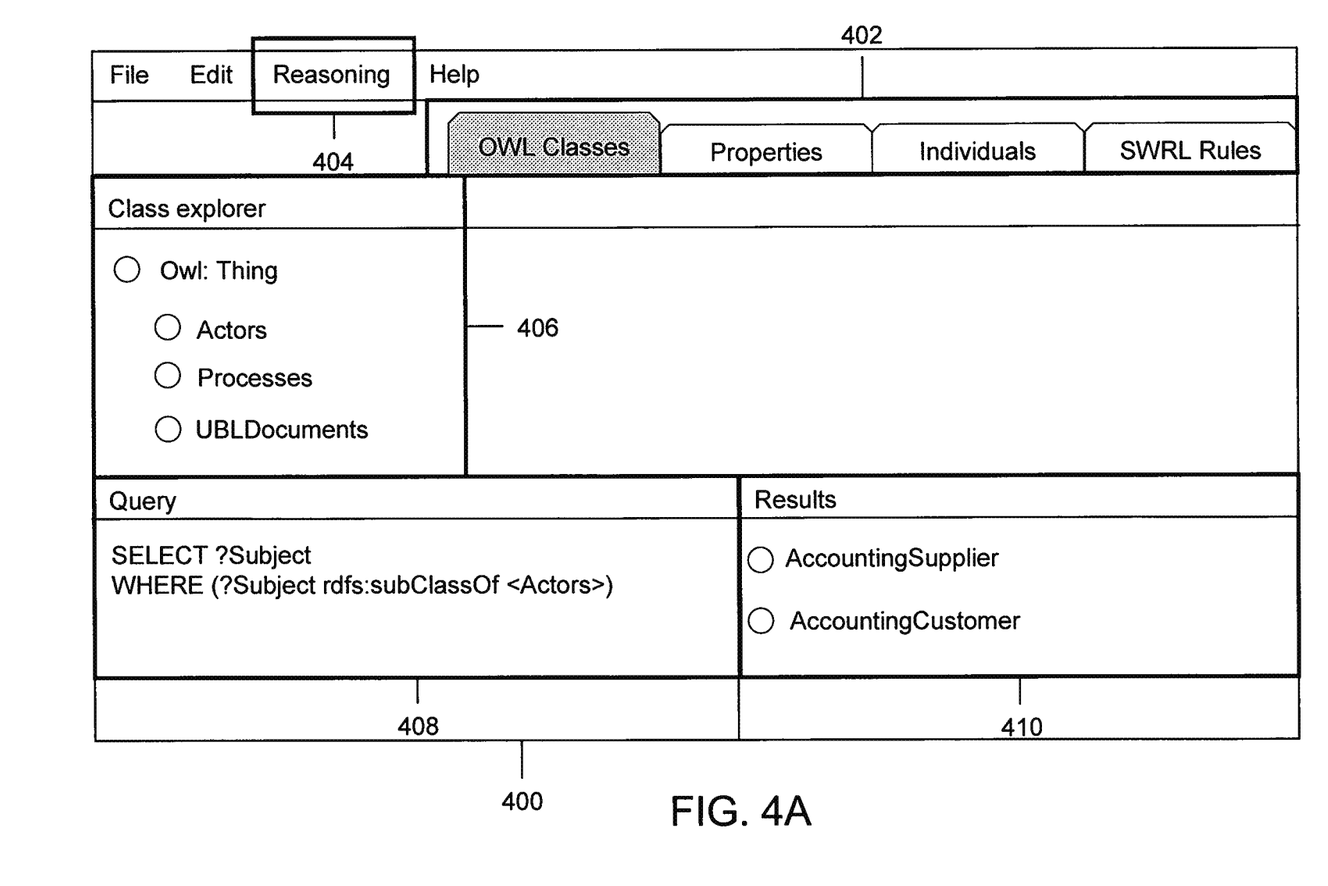
Figure 4B:
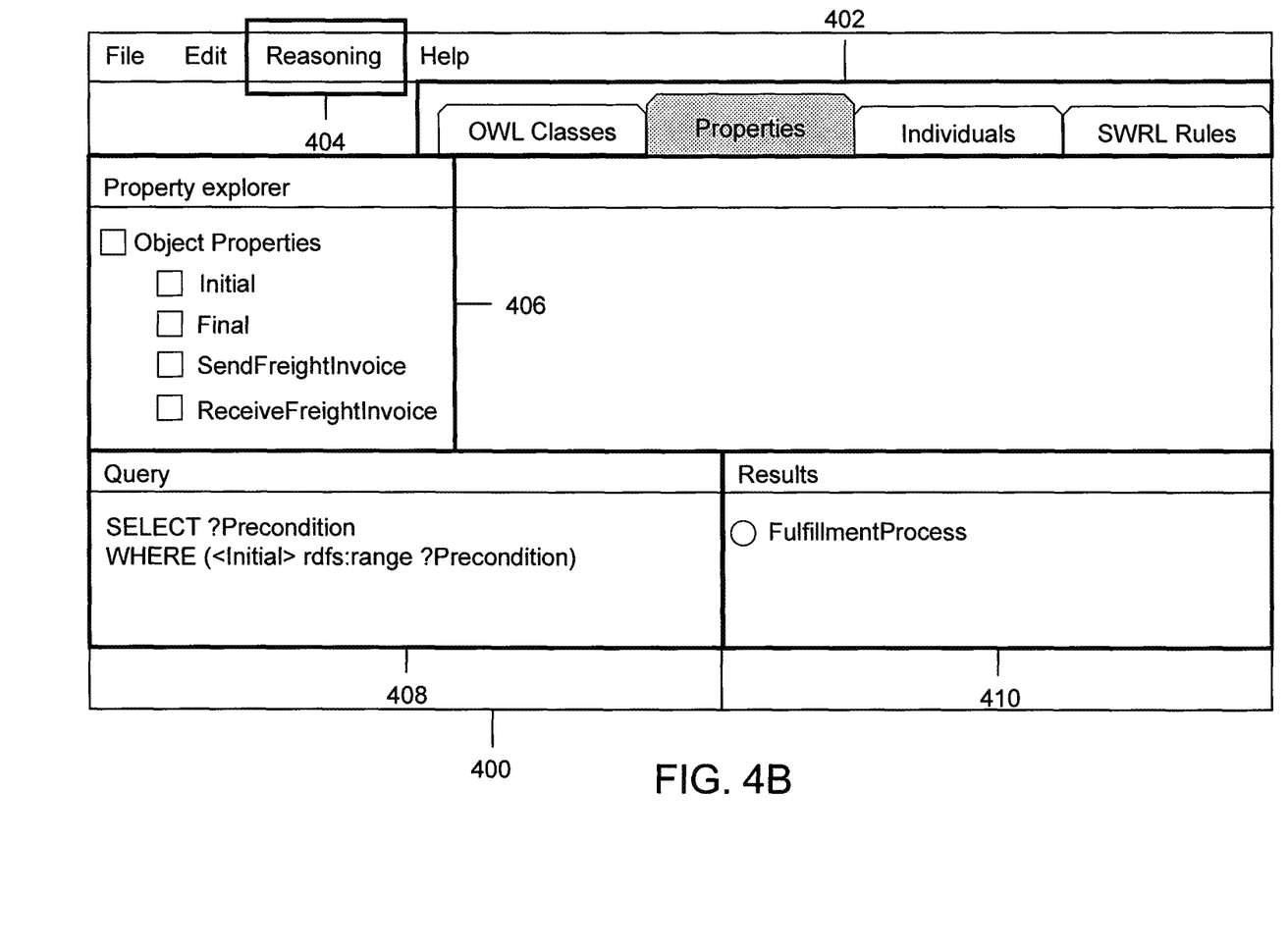

FIGS. 4A and 4B illustrate a block diagram of a system 400 for viewing and querying the OWL ontology created from UBL process diagram 100, in accordance with an embodiment of the invention.

System 400 is a third-party vendor software product and may be embodied as a Graphical User Interface (GUI). The GUI includes a menu section 402, a reasoning function 404, an explorer section 406, a querying section 408, and a result section 410.

Menu Section 402

Menu section 402 includes options such as "OWL classes", "Properties", "Individuals", and "SWRL rules". On selecting an option from menu section 402, a corresponding section is displayed in explorer section 406. For example, when the option "OWL classes" is selected, a "class explorer" is displayed in explorer section 406. With reference to UBL process diagram 100, explorer section 406 depicts the three OWL classes—Processes, Actors, and UBLDocuments.

Reasoning Function 404

Reasoning function 404 includes options such as "check consistency" and "compute inferred types" (not shown in FIGS. 4A and 4B). By the "check consistency" option, the OWL ontology is checked for contradictory facts. Further, by the "compute inferred types" option, all inferred types of an OWL instance are computed.

In an embodiment of the present invention, a Description Logic Implementation Group (DIG) interface may be used to perform reasoning on the OWL ontology, where the DIG interface is a standard interface/protocol that provides uniform access to Description Logic Reasoners. In another embodiment of the present invention, a direct reasoner may also be used to perform reasoning on the OWL ontology. Examples of reasoning function 404 may include, but are not limited to, Pellet®, Racer®, and Jena®.

Querying Section 408

In querying section 408, Simple Protocol and RDF (Resource Description Framework) (SPARQL) queries are executed, the results of which are displayed in result section 410.

A typical SPARQL query consists of two parts—a SELECT clause and a WHERE clause. The SELECT clause identifies the variables to appear in the query results, and the WHERE clause provides a comparison string. The following is an exemplary syntax of a SPARQL query:

```
SELECT (?variable)
WHERE (<comparison string>)
```

For example, consider that all the partitions of UBL process diagram 100 need to be retrieved. As discussed in FIGS. 2A and 2B, the partitions are illustrated as instances to the OWL class Actors in the corresponding OWL ontology. Therefore, a query reads

```
SELECT ?Subject
WHERE (?Subject rdfs:subClassOf <Actors>)
```

Subsequently, the resultant of the above query, i.e., AccountingSupplier and AccountingCustomer, is displayed in results section 410.

In FIG. 4B, when the option "Properties" is selected from menu section 402, a "property explorer" is displayed in explorer section 406. The "property explorer" illustrates four object properties—Initial, Final, SendFreightInvoice, and ReceiveFreightInvoice of the OWL ontology created from UBL process diagram 100.

For example, consider that a pre-condition of UBL process diagram 100 needs to be determined. The pre-condition is stored as the range of the object property Initial in the OWL ontology. Therefore, a corresponding query reads the following:

```
SELECT ?Precondition
WHERE (<Initial> rdfs:range ?Precondition)
```

Subsequently, the resultant of the above query, i.e., FulfillmentProcess is displayed in results section 410.

The method and the system described above have numerous advantages. The present invention facilitates creating OWL ontology from a UBL process diagram without creating an intermediary UML profile. Further, the present invention allows the use of an UML activity diagram for conversion to OWL. The present invention also facilitates performing reasoning on the OWL ontology and allows editing and modification using description logic reasoners. In addition, the present invention allows querying of the OWL ontology for extracting useful information.

The method and the system for creating OWL ontology from a UBL process diagram, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for creating OWL ontology from a UBL process diagram. The computer program product includes a computer readable storage medium having a set program instructions comprising a computer readable program code for creating OWL ontology from a UBL process diagram. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing, or a request made by another processing machine.

While the preferred embodiments of the invention have been illustrated and described, it will be clear that the invention is not limit to these embodiments only. Numerous modifications, changes, variations, substitutions, and equivalents will be apparent to those skilled in the art without departing from the spirit and scope of the invention, as described in the claims.

What is claimed is:

1. A method for creating OWL (Web Ontology Language) ontology from a UBL (Universal Business Language) process diagram, the method comprising:
    extracting, by a data converting computing device, at least one of one or more processes, one or more partitions, one or more activities, or one or more objects from the UBL process diagram;
    creating, by the data converting computing device, a first OWL class corresponding to the one or more processes assigned as instances to the first OWL class, a second OWL class corresponding to the one or more partitions assigned as instances to the second OWL class, a third OWL class corresponding to the one or more assigned as instances to the third OWL class, and one or more object properties, wherein the one or more object properties correspond to the one or more activities;
    assigning, by the data converting computing device, a domain and a range corresponding to each of the one or more object properties, wherein assigning the range to each of the one or more object properties comprises determining an object associated with each of the one or more object properties assigning the object as the range to each of the one or more object properties;
    generating, by the data converting computing device, an OWL ontology by adding the first OWL class, the second OWL class, the third OWL class, and the one or more object properties; and
    associating, by the data converting computing device, one or more rules with the one or more object properties, wherein the one or more rules capture the sequence of the one or more activities.

2. The method of claim 1, wherein assigning the domain corresponding to each of the one or more object properties comprises:
    determining, by the data converting computing device, a partition associated with each of the one or more object properties; and
    assigning, by the data converting computing device, the partition as the domain to each of the one or more object properties.

3. The method of claim 1, further comprising creating, by the data converting computing device, the one or more object properties for each of an initial node and a final node, wherein the initial node and the final node connect the one or more processes in the UBL process diagram.

4. The method of claim 3, wherein the creating the object property for each of the initial node and the final node further comprises:
    assigning, by the data converting computing device, a current process as a domain to each of the one or more object properties; and
    assigning, by the data converting computing device, other processes as a range to each of the one or more object properties.

5. The method of claim 1, further comprising:
    storing, by the data converting computing device, the OWL ontology in a knowledge base.

6. The method of claim 5, further comprising querying, by the data converting computing device, the knowledge base to extract information from the OWL ontology.

7. A non-transitory computer readable medium having stored thereon instructions for creating OWL (Web Ontology Language) ontology from a UBL (Universal Business Language) process diagram comprising machine executable code which when executed by at least one processor, causes the processor to perform steps comprising:
    extracting at least one of one or more processes, one or more partitions, one or more activities, or one or more objects from the UBL process diagram;
    creating a first OWL class corresponding to the one or more processes assigned as instances to the first OWL class, a second OWL class corresponding to the one or more assigned as instances to the second OWL class, a third OWL class corresponding to the one or more objects assigned as instances to the third OWL class, and one or more object properties, wherein the one or more object properties correspond to the one or more activities;
    assigning a domain and a range corresponding to each of the one or more object properties, wherein assigning the range to each of the one or more object properties comprises determining an object associated with each of the one or more object properties assigning the object as the range to each of the one or more object properties;
    generating an OWL ontology by adding the first OWL class, the second OWL class, the third OWL class, and the one or more object properties; and
    associating one or more rules with the one or more object properties, wherein the one or more rules capture the sequence of the one or more activities.

8. The non-transitory computer readable medium of claim 7, wherein the assigning the domain corresponding to each of the one or more object properties comprises:
    determining a partition associated with each of the one or more object properties; and
    assigning the partition as the domain to each of the one or more object properties.

9. The non-transitory computer readable medium of claim 7, further comprising creating the one or more object properties for each of an initial node and a final node, wherein the initial node and the final node connect the one or more processes in the UBL process diagram.

10. The non-transitory computer readable medium of claim 9, wherein the creating the object property for each of the initial node and the final node further comprises:
    assigning a current process as a domain to each of the one or more object properties; and
    assigning other processes as a range to each of the one or more object properties.

11. The non-transitory computer readable medium of claim 7, further comprising:
    storing the OWL ontology in a knowledge base.

12. The non-transitory computer readable medium of claim 11, further comprising querying the knowledge base to extract information from the OWL ontology.

13. A data converting computing device for creating OWL (Web Ontology Language) ontology from a UBL (Universal Business Language) process diagram, comprising:
    one or more processors;
    memory coupled to the one or more processors and configured to be capable of executing programmed instructions comprising and stored in the memory to:

extract at least one of one or more processes, one or more partitions, one or more activities, or one or more objects from the UBL process diagram;

create a first OWL class corresponding to the one or more processes assigned as instances to the first OWL class, a second OWL class corresponding to the one or more partitions assigned as instances to the second OWL class, a third OWL class corresponding to the one or more objects assigned as instances to the third OWL class, and one or more object properties, wherein the one or more object properties correspond to the one or more activities;

assign a domain and a range corresponding to each of the one or more object properties, wherein assigning the range to each of the one or more object properties comprises determining an object associated with each of the one or more object properties assigning the object as the range to each of the one or more object properties;

generate an OWL ontology by adding the first OWL class, the second OWL class, the third OWL class, and the one or more object properties; and associate one or more rules with the one or more object properties, wherein the one or more rules capture the sequence of the one or more activities.

14. The device as set forth in claim 13, wherein the one or more processors are further configured to be capable of executing programmed instructions for the assigning the domain corresponding to each of the one or more object properties, which comprise the programmed instructions stored in the memory to:

determine a partition associated with each of the one or more object properties; and assign the partition as the domain to each of the one or more object properties.

15. The device as set forth in claim 13, wherein the one or more processors are further configured to be capable of executing programmed instructions, which comprise the programmed instructions stored in the memory to:

create the one or more object properties for each of an initial node and a final node, wherein the initial node and the final node connect the one or more processes in the UBL process diagram.

16. The device as set forth in claim 15, wherein the one or more processors are further configured to be capable of executing programmed instructions for the creating the one or more object properties for each of the initial node and the final node, which comprise the programmed instructions stored in the memory to:

assign a current process as a domain to each of the one or more object properties; and assign other processes as a range to each of the one or more object properties.

17. The device as set forth in claim 13, wherein the one or more processors are further configured to be capable of executing programmed instructions, which comprise the programmed instructions stored in the memory to:

store the OWL ontology in a knowledge base.

18. The device as set forth in claim 17, wherein the one or more processors are further configured to be capable of executing programmed instructions, which comprise the programmed instructions stored in the memory to:

query the knowledge base to extract information from the OWL ontology.

19. The device as set forth in claim 13, wherein the one or more processors are further configured to be capable of executing programmed instructions, which comprise the programmed instructions stored in the memory to:

compute all inferred types in the OWL ontology.

20. The method of claim 1, further comprising:

computing, by the data converting computing device, all inferred types in the OWL ontology.

21. The non-transitory computer readable medium of claim 7 further having stored thereon instructions that when executed by the processor cause the processor to perform steps further comprising:

computing all inferred types in the OWL ontology.

* * * * *